US007298700B1

(12) United States Patent
Doverspike et al.

(10) Patent No.: US 7,298,700 B1
(45) Date of Patent: Nov. 20, 2007

(54) METHOD FOR UNIDIRECTIONAL AND BIDIRECTIONAL LABEL SWITCHED PATH SETUP IN A LABEL SWITCHED NETWORK

(75) Inventors: Robert Duncan Doverspike, Tinton Falls, NJ (US); Charles Robert Kalmanek, Jr., Short Hills, NJ (US); Guangzhi Li, Harrison, NJ (US); Jennifer Yates, Madison, NJ (US)

(73) Assignee: AT&T Corp., New York, NY (US)

( * ) Notice: Subject to any disclaimer, the term of this patent is extended or adjusted under 35 U.S.C. 154(b) by 1128 days.

(21) Appl. No.: 10/063,923

(22) Filed: May 24, 2002

Related U.S. Application Data

(60) Provisional application No. 60/293,365, filed on May 24, 2001.

(51) Int. Cl.
*H04B 1/44* (2006.01)

(52) U.S. Cl. .............. 370/235; 370/282; 370/395.42; 370/395.5; 710/21
(58) Field of Classification Search ............... 370/237, 370/352, 353, 354, 355, 356, 392, 468, 395.5, 370/395.51, 395.52, 395.21, 395.42, 395.43
See application file for complete search history.

(56) References Cited

U.S. PATENT DOCUMENTS

| 6,901,053 | B1* | 5/2005 | Davies ........................ 370/237 |
| 2002/0057691 | A1* | 5/2002 | Enoki et al. ................. 370/392 |
| 2002/0191247 | A1* | 12/2002 | Lu et al. ...................... 359/124 |

* cited by examiner

*Primary Examiner*—Wellington Chin
*Assistant Examiner*—Shick Hom

(57) ABSTRACT

Label contention in a label switched network is resolved by applying a contention resolution scheme that reconciles policies for handling unidirectional and bidirectional label switched path setup.

6 Claims, 5 Drawing Sheets

(MODIFIED FROM ORIGINAL)

(MODIFIED FROM ORIGINAL)

(MODIFIED FROM ORIGINAL)

|  | REQUEST - UNI | REQUEST - BI | REPLY - UNI | REPLY - BI |
|---|---|---|---|---|
| REQUEST - UNI | OK | BI | REPLY | REPLY |
| REQUEST - BI | BI | MASTER | REPLY | REPLY |
| REPLY - UNI | REPLY | REPLY | OK | OK |
| REPLY - BI | REPLY | REPLY | OK | OK |

FIG. 4

(MODIFIED FROM ORIGINAL)

METHOD FOR UNIDIRECTIONAL AND BIDIRECTIONAL LABEL SWITCHED PATH SETUP IN A LABEL SWITCHED NETWORK

CROSS REFERENCE TO RELATED APPLICATIONS

This application claims priority to United States Provisional Application "MIXED UNIDIRECTIONAL AND BI-DIRECTIONAL LSP SETUP IN GMPLS FRAMEWORK," Ser. No. 60/293,365, filed on May 24, 2001, the contents of which are incorporated by reference herein.

BACKGROUND OF INVENTION

The present invention relates to label distribution in a label switched network and, more particularly, to resolving contention in networks that permit unidirectional and bidirectional label switched paths.

Multi-Protocol Label Switching (MPLS) is an advanced framework for high-speed data forwarding that differs from conventional destination-based IP routing: each packet is provided with a "label" that is used by label switched routers (LSRs) to forward the packet along what is referred to as a label switched path (LSP). See E. Rosen et al., "Multiprotocol Label Switching Architecture," Internet Engineering Task Force (IETF) Network Working Group, Request for Comments (RFC) 3031. LSRs inform adjacent nodes of label bindings using a process of label distribution which is known as LSP setup. See, e.g., L. Andersson et al., "LDP Specification," IETF Network Working Group, RFC 3036. Labels are by convention allocated and distributed from a downstream direction—where "downstream" in the art refers to the direction of data flow. In the context of IP networks, where LSPs are assumed to be unidirectional, downstream label selection convention assures that there is no label contention among connection requests coming from different directions.

Generalized MPLS ("GMPLS"), also referred to in the art as Multi-Protocol Lambda Switching ("MPL(ambda)S"), extends MPLS to support—not just packet-switching devices—but devices that perform switching in the time, wavelength, and space domains. GMPLS provides the potential for a control plane that can be utilized with legacy equipment (e.g. SONET) as well as newer devices (e.g. optical crossconnects ("OXCs")). See, e.g., D. Awduche et al., "Multi-Protocol Lambda Switching: Combining MPLS Traffic Engineering Control with Optical Crossconnects," IETF Network Working Group, Internet Draft. For various practical reasons, current GMPLS signaling mechanisms permit the setup of what are referred to in the art as bidirectional LSPs. See P. Ashwood-Smith, et al., "Generalized MPLS—Signaling Functional Description," IETF Network Working Group, Internet Draft. The introduction of bidirectional LSPs creates the practice of upstream label distribution and suggested label distribution. These two label distribution policies presents the possibility of contention between two bidirectional LSP requests traveling in opposite directions between two adjacent nodes. If there is no restriction on the ports/channels that can be used for bidirectional LSPs and if there are alternate resources, then both nodes will pass different labels upstream/downstream and the contention will be resolved naturally. If there is a restriction on the ports/channels that can be used for the bidirectional LSPs (for example if they must be physically coupled on a single I/O card), or if there are no more resources available, then the contention must be resolved by some other means. The current GMPLS signaling proposal suggests letting the node with the higher node ID win the contention.

Unfortunately, current GMPLS proposals do not address the situation when a unidirectional LSP and a bidirectional LSP compete for the same resources. A network operator, in fact, may wish to offer both unidirectional and bidirectional high speed connections over the same network—without incurring the possible provisioning costs of segregating interfaces on network nodes between such connections. In a shared unidirectional and bidirectional LSP GMPLS network, a unidirectional LSP setup request message may carry a suggested label; the corresponding reply message may carry a label based on downstream label distribution policy. A bidirectional LSP setup request message should carry an upstream label and may carry a suggested label; the related reply message may carry a label based on downstream label distribution policy. The above-mentioned prior art contention schemes for handling bidirectional and unidirectional LSPs, however, are not consistent. Accordingly, there is a need for enhanced contention resolution procedures that can handle such situations.

SUMMARY OF INVENTION

Label contention in a label switched network is resolved by applying a contention resolution scheme that reconciles policies for handling unidirectional and bidirectional label switched path setup. In accordance with an embodiment of the invention, label contention between a first label switched path setup message sent by a first node in a label switched network and a second label switched path setup message sent by a second node in the network is resolved by giving priority in accordance with a contention scheme that takes into account the nature of the respective setup messages. Priority can be given to the first label switched path setup message where the setup message is a label reply and the second label switched path setup message is a label request. Priority can also be given to the label switched path setup message for a bidirectional label switched path over setup messages for a unidirectional label switched path. Where the setup messages are both for unidirectional label switched paths or both for bidirectional label switched paths, the contention can be advantageously resolved using different contention policies, e.g., using downstream label selection or selecting the node with the higher node identification, respectively. Thus, the present invention can be utilized to resolve inconsistent prior art contention policies.

Alternatively, in accordance with another embodiment of the invention, label contention between the first label switched path setup message sent by the first node in the label switched network and the second label switched path setup message sent by the second node in the network can be resolved by giving priority in accordance with the same contention policy for unidirectional and bidirectional label switched paths. For example, the node with the higher identification can be given higher priority, even where the nodes are requesting setup of unidirectional label switched paths.

The contention resolution procedures disclosed in the present invention permit a network operator to offer bidirectional and unidirectional label switched paths over the same label switched network without a need to segregate the interfaces. These and other advantages of the invention will be apparent to those of ordinary skill in the art by reference to the following detailed description and the accompanying drawings.

BRIEF DESCRIPTION OF DRAWINGS

FIG. 4 is a contention resolution table, in accordance with a preferred embodiment of the invention.

DETAILED DESCRIPTION

Figure 1:
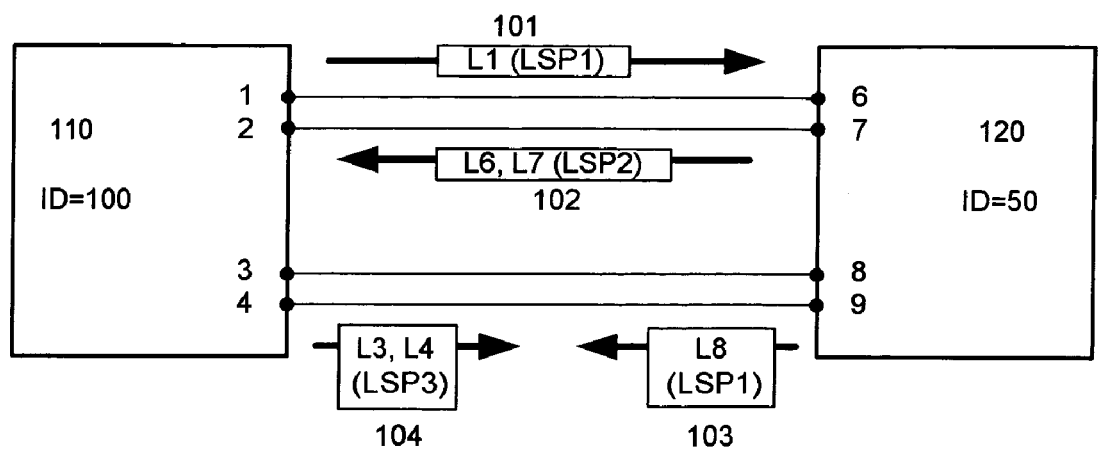
FIG. 1 is a diagram of two label switched nodes in a label switched network, exchanging label switched path setup messages.

FIG. 1 is a diagram of two nodes 110 and 120 in a label-switched network, illustrating an example of contention that can be handled by the present invention. The nodes 110, 120 are two out of a plurality of nodes connected in an arbitrary topology that permits connectivity between a plurality of ingress/egress nodes. For example and without limitation, the label-switched network can be an optical network, each node 110, 120 comprising an optical cross-connect and a wavelength division multiplexer terminal that multiplexes optical signals at different wavelengths into an optical fiber leading to another node.

Each node has one or more channels/ports that connect it to an adjacent node in the network. Node 110 in FIG. 1 is shown as having two bidirectional I/O interfaces (i.e. a transmitter/receiver pair of ports). The first I/O interface is assigned label "1" for the transmitter port and label "2" for the receiver port. The second I/O interface is assigned label "3" for the transmitter port and label "4" for the receiver port. Similarly, there are two I/O interfaces in node 120. The first I/O interface is assigned label "7" for the transmitter port and label "6" for the receiver port. The second I/O interface is assigned label "9" for the transmitter port and label "8" for the receiver port.

A label-switched path ("LSP") through the network is established using the exchange of label distribution messages between adjacent nodes, in accordance with an advantageous protocol such as RSVP-TE or CR-LDP. See, e.g., P. Ashwood-Smith, et al., "Generalized MPLS—Signaling Functional Description," IETF Network Working Group, Internet Draft; L. Berger, et al., "Generalized MPLS Signaling—RSVP-TE Extensions," IETF Network Working Group, Internet Draft; D. Awduche et al., "RSVP-TE: Extensions to RSVP for LSP tunnels," IETF Network Working Group, Internet Draft; P. Ashwood-Smith, et al., "Generalized MPLS Signaling—CR-LDP Extensions," IETF Network Working Group, Internet Draft; and B. Jamoussi, et al., "Constraint-Based LSP Setup using LDP," IETF Network Working Group, Internet Draft, which are incorporated by reference herein.

Figure 2A:
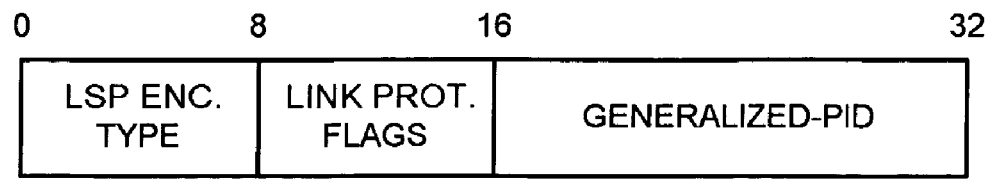
FIG. 2A is an abstract diagram of a generalized label request and FIG. 2B is an abstract diagram of a generalized label.
Figure 2B:
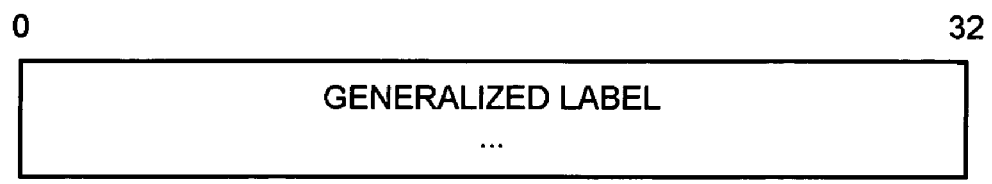
Figure 2C:
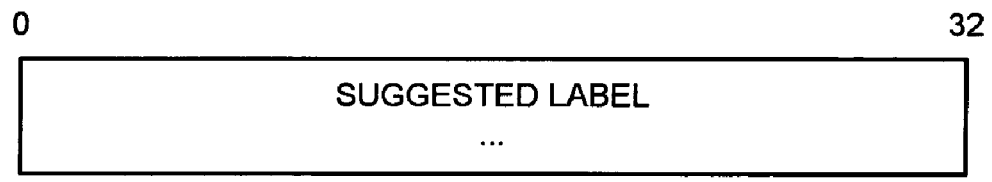
FIG. 2C is an abstract diagram of a suggested label and FIG. 2D is an abstract diagram of an upstream label.
Figure 2D:
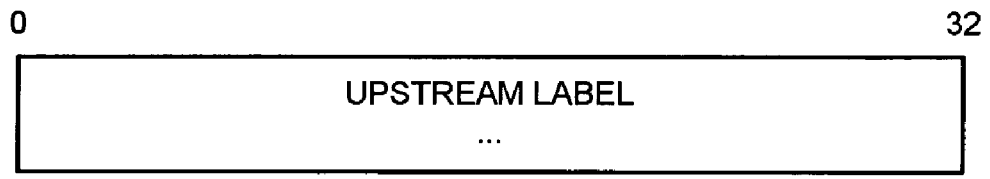

For example, in FIG. 1, node 110 is depicted as requesting the setup of a unidirectional LSP between node 110 and node 120. Node 110 sends a label request 101 to node 120, for example a REQUEST/PATH message that contains a generalized label request in the format shown in FIG. 2A. See, "Generalized MPLS—Signaling Functional Description," above. The node 110 includes a suggested label with the generalized label request, namely label "1" for the unidirectional LSP1, which allows node 110 to start configuring its hardware immediately. Downstream node 120 can accept the proposed label or select an alternative label, in the format depicted in FIG. 2C, and reply for example using a MAPPING/RESV message which includes the generalized label. In FIG. 1, however, it turns out that node 120 is attempting to setup a bidirectional LSP between node 120 and node 110. This is accomplished by sending a REQUEST/PATH message suggesting a particular label for the path from node 120 to node 110 while including an "upstream" label object for the path from node 110 to node 120, in the format depicted in FIG. 2D. If accepted by node 110, this would result in two unidirectional channels/ports being assigned in a same-numbered pair (one channel/port-pair with the same number/ID in each direction). It is assumed in FIG. 1 that there exists some restriction on which ports/channels can be used for a bidirectional LSP, e.g., a bidirectional LSP requires a single I/O interface at node 110 and node 120. When node 120 assigns the downstream label "6" and suggests label "7" for the bidirectional LSP2 between node 120 and node 110, this results in a contention between the two proposed connections.

Suppose that LSP2 is given priority in accordance with the downstream label selection rule for unidirectional LSP1. Node 120 can attempt to assign a new label, such as label "8" for LSP1. Suppose, however, that at the same time that node 120 assigns label "8" for LSP1, node 110 assigns a downstream label "4" and suggests label "3" for another bidirectional LSP3 from node 110 to node 120. How is this contention to be resolved? Even if it is assumed that node 110 has a higher node ID than node 120 (e.g. node 110 is shown in FIG. 1 as having a node ID=100 while node 120 is shown as having a node ID=50), a new mechanism is needed to resolve this type of contention.

Figure 3:
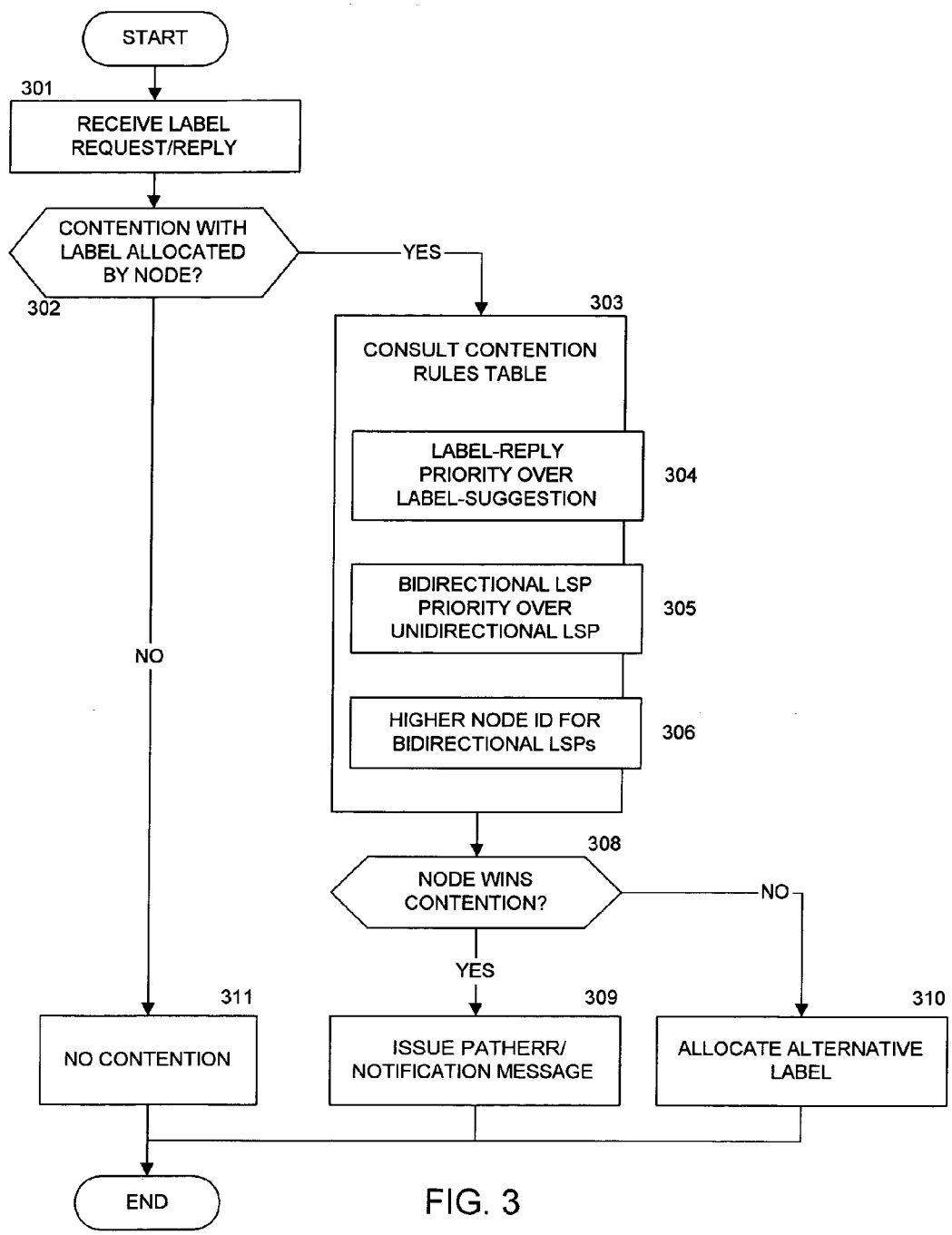
FIG. 3 is a flowchart of processing performed by a label switched network node, in accordance with a first embodiment of the invention.

FIG. 3 sets forth a flowchart of processing performed by a node in the label switched network, in accordance with a preferred embodiment of an aspect of the invention. At step 301, the node receives a LSP setup message, either a label request or a label reply, from another node in the network. At step 302, the node checks to see whether the received message will cause any contention with any label assignments/suggestions by the node. If not, then at step 311, there is no contention and the LSP setup message is processed normally. If there is contention for selection of one or more particular ports/channels, then at step 303, the node consults a set of contention resolution rules to decide which label message should "win" the contention. It is advantageous for the contention rules to be consistent with existing contention resolution procedures for unidirectional and bidirectional LSPs. Thus, in accordance with a preferred embodiment of the invention, the following rules can be used to decide which label wins the contention:

(1) Downstream label selection for unidirectional LSPs;
(2) Higher node ID for bidirectional LSPs;
(3) LSP with label-reply has higher priority over LSP with label-suggestion.
(4) Bidirectional LSPs have priority over unidirectional LSPs;

These contention resolution rules are illustrated at steps 304, 305, 306, and 307 in FIG. 3. As described in the background, the first two rules are advantageously consistent with existing GMPLS contention resolution procedures for unidirectional and bidirectional LSPs respectively.

The third rule is suggested by the nature of the LSP signaling process. In the GMPLS framework, as described above, both CR-LDP or RSVP-TE need two message waves to establish a LSP. The first one is some kind of label-request with or without a label suggestion. The second one is a label-reply. If there is a contention between a label-request (with a label suggestion) and a label-reply, the label-reply should be allowed to win. The reason is that label-request still has a chance to select a new label on label-reply. Note that this rule is consistent with downstream label distribution convention.

The fourth rule is suggested by the nature of bidirectional LSPs. If there is a contention between a unidirectional LSP and a bidirectional LSP, all other things being equal, then the bidirectional LSP should be allowed to win. The rationale for this rule is that a bidirectional LSP is "harder" to establish than a unidirectional LSP. A pair of nodes could be configured to give unidirectional LSPs priority over bidirectional LSPs, although it is not clear that there is any advantage to allowing this flexibility.

With reference again to FIG. 3, the node determines which label "wins" the contention, at step 308, using the contention resolution rules. If the label allocated by the node wins the contention, then, at step 309, the node is responsible for issuing an error message, e.g. a PathErr/NOTIFICATION message with a "Routing problem/Label allocation failure" indication. If the label allocated by the node loses the contention, then, at step 310, the node will receive such an error message and will need to allocate a different label(s) for the desired LSP. If no other resources are available, the node will need to proceed with standard error handling for such situations.

FIG. 4 is a table that expands upon the above-mentioned contention resolution rules and reflects an embodiment/implementation of said rules. The table defines how contention is to be resolved at a node. The column headings indicate the LSP setup message that has been sent by the node. The rows indicate the message that has been received by the node. "REQUEST-UNI" means a label request suggesting a label for a unidirectional LSP. "REQUEST-BI" means a label request for a bidirectional LSP. "REPLY-UNI" means a label reply assigning a label for a unidirectional LSP. "REPLY-BI" means a label reply for a bidirectional LSP. In the table, "OK" means that there should be no contention, in other words, conventional downstream label selection for unidirectional LSPs should resolve any possible contention. "BI" means that the bidirectional LSP should win; and "REPLY" means that the label-reply should win. "MASTER" means that conventional bidirectional LSP contention rules should be used, e.g., the LSP with the label assigned by the higher node-id should win.

Figure 5:
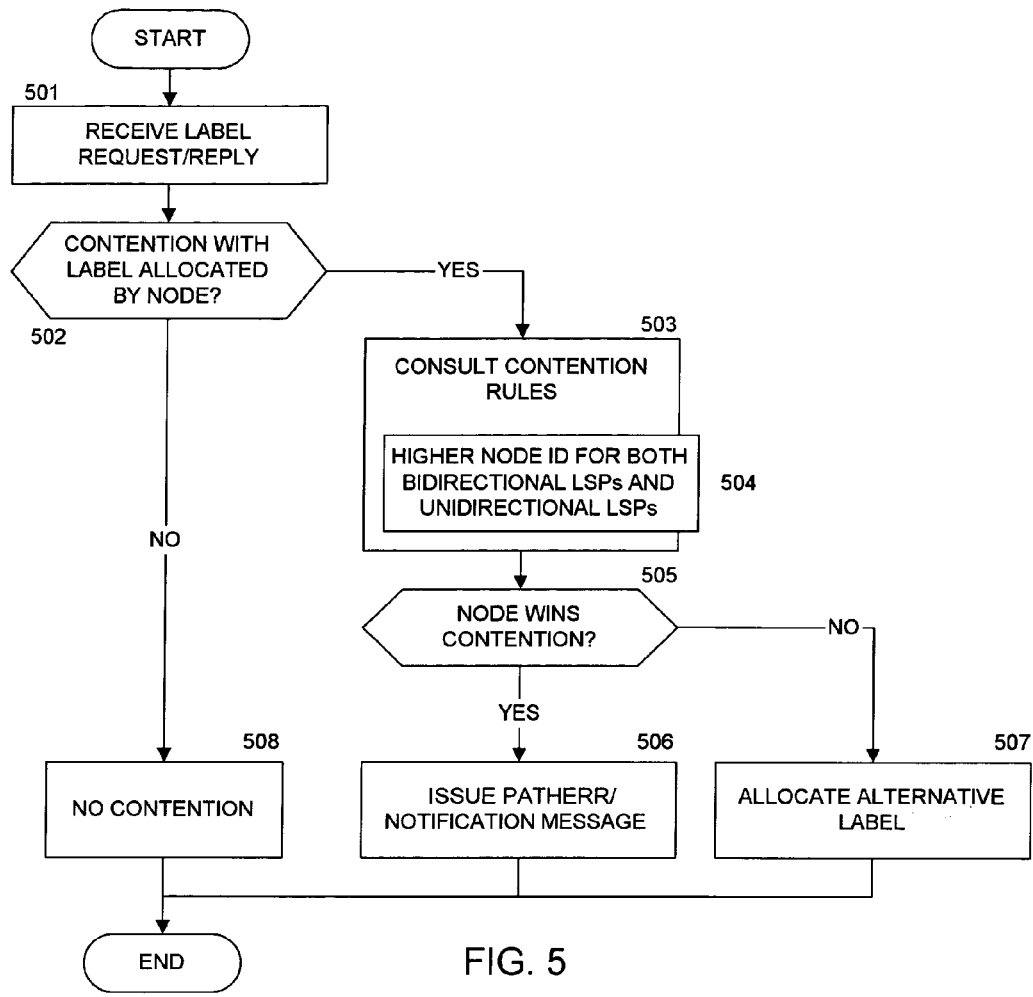
FIG. 5 is a flowchart of processing performed by a label switched network node, in accordance with a second embodiment of the invention.

FIG. 5 sets forth an alternative contention resolution scheme that disadvantageously results in a change to either the rule for unidirectional LSPs or for bidirectional LSPs. At step 501, the node receives a label-request or label-reply message from another node in the network. At step 502, the node checks to see whether the received message causes any contention with any label assignments/suggestions by the node. If not, then at step 508, there is no contention and the message is processed normally. If there is contention for selection of one or more particular ports/channels, then at step 503, the node decides which label message "wins" the contention by using the same contention rule for both bidirectional and unidirectional LSPs. For example, as illustrated in FIG. 5, the node uses the bidirectional LSP contention resolution scheme—namely, determining which node has a higher node ID—for both bidirectional LSPs and unidirectional LSPs. As mentioned above, this has the disadvantage of changing the downstream label selection rule for unidirectional LSPs. Then, at step 505, if the label assigned by the node wins the contention, that node at step 506 issues an error message to the other node that assigned the label that lost the contention. Otherwise, at step 507, an alternate label must be allocated by the losing node upon receipt of the appropriate error message.

The present invention advantageously permits a network operator to offer unidirectional high speed connections over the same network infrastructure for bidirectional high speed connections. For example, customers for unidirectional connections could be Internet Service Providers (ISPs) or other data service providers who only want to pay for the transport of router links in one direction. Indeed, such applications are required in OIF UNI1.0, ODSI signaling control specification, and IETF GMPLS framework.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to GMPLS. However, the principles of the present invention could be readily extended to other label switched protocols which permit unidirectional and bidirectional label switched paths. Such an extension could be readily implemented by one of ordinary skill in the art given the above disclosure.

The invention claimed is:

1. A method of resolving label contention in a label switched network comprising:
   (i) receiving a first label switched path setup message sent by a first node in the network;
   (ii) determining whether the first label switched path setup message contends for a same label assigned or suggested in a second label switched path setup message sent by a second node in the network;
   (iii) giving priority to the second label switched path setup message if the first label switched path setup message is a label request and if the second label switched path setup message is a label reply;
   (iv) giving priority to the second label switched path setup message if the first label switched path setup message is a setup message for a unidirectional label switched path and if the second label switched path setup message is a setup message for a bidirectional label switched path; and
   (v) giving priority in accordance with a first contention policy if both the first and second label switched path setup messages are setup messages for unidirectional label switched paths and in accordance with a second contention policy, different from the first contention policy, if both the first and second label switched path setup messages are setup messages for bidirectional label switched paths.

2. The method of claim 1 wherein the first contention policy gives priority in accordance with downstream label selection.

3. The method of claim 2 wherein the second contention policy gives priority to the node with a higher node identification.

4. A method of resolving label contention in a label switched network comprising:

(i) receiving a first label switched path setup message sent by a first node in the network;
(ii) determining whether the first label switched path setup message contends for a same label assigned or suggested in a second label switched path setup message sent by a second node in the network;
(iii) giving priority to the second label switched path setup message if the first label switched path setup message is a setup message for a unidirectional label switched path and if the second label switched path setup message is a setup message for a bidirectional label switched path; and
(iv) giving priority in accordance with a first contention policy if both the first and second label switched path setup messages are setup messages for unidirectional label switched paths and in accordance with a second contention policy, different from the first contention policy, if both the first and second label switched path setup messages are setup messages for bidirectional label switched paths.

5. The method of claim 4 wherein the first contention policy gives priority in accordance with downstream label selection.

6. The method of claim 5 wherein the second contention policy gives priority to the node with a higher node identification.

* * * * *